United States Patent
Passoni et al.

(10) Patent No.: US 10,712,042 B2
(45) Date of Patent: Jul. 14, 2020

(54) TEMPERATURE CONTROL VALVE

(71) Applicant: Johnson Controls Technology Company, Auburn Hills, MI (US)

(72) Inventors: Marcello Passoni, Vimercate (IT); Alejandro Gonzalez Pozo, Milwaukee, WI (US); Gabriele Francesco Giuseppe Andreoni, Milan (IT)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/112,384

(22) Filed: Aug. 24, 2018

(65) Prior Publication Data

US 2019/0063778 A1 Feb. 28, 2019

Related U.S. Application Data

(60) Provisional application No. 62/550,250, filed on Aug. 25, 2017.

(51) Int. Cl.

| | |
|---|---|
| *F24F 11/84* | (2018.01) |
| *F24F 11/74* | (2018.01) |
| *F24F 11/30* | (2018.01) |
| *G05D 23/19* | (2006.01) |
| *F24F 140/20* | (2018.01) |

(Continued)

(52) U.S. Cl.
CPC .............. *F24F 11/84* (2018.01); *F24F 11/30* (2018.01); *F24F 11/74* (2018.01); *G05D 23/1919* (2013.01); *G05D 23/1931* (2013.01); *F24F 11/64* (2018.01); *F24F 2110/10* (2018.01); *F24F 2140/20* (2018.01)

(58) Field of Classification Search
CPC .. F24F 11/84; F24F 11/74; F24F 11/30; F24F 11/64; F24F 2110/10; F24F 2140/20; G05D 23/1919; G05D 23/1931
USPC ........................................................ 165/253
See application file for complete search history.

(56) References Cited

U.S. PATENT DOCUMENTS

| | | | |
|---|---|---|---|
| 6,352,106 B1 | 3/2002 | Hartman | |
| 6,467,289 B2 | 10/2002 | Kuroki et al. | |

(Continued)

FOREIGN PATENT DOCUMENTS

| | | |
|---|---|---|
| CN | 101256020 B | 7/2010 |
| JP | 2000111181 A * | 4/2000 |

(Continued)

OTHER PUBLICATIONS

International Search Report and Written Opinion for PCT Application No. PCT/US2018/047973 dated Dec. 5, 2018, 13 pages.

(Continued)

*Primary Examiner* — Tho V Duong
*Assistant Examiner* — Raheena R Malik
(74) *Attorney, Agent, or Firm* — Fletcher Yoder P.C.

(57) ABSTRACT

The present disclosure relates to a heating, ventilation, and air conditioning (HVAC) system that includes a heat exchanger configured to circulate a working fluid therethrough, a valve configured to regulate a flow rate of the working fluid through the heat exchanger, and a valve controller configured to modify a valve position control signal received from an external controller, separate from the valve controller, based on a temperature differential of the working fluid entering and exiting the heat exchanger.

26 Claims, 8 Drawing Sheets

(51) Int. Cl.
*F24F 11/64* (2018.01)
*F24F 110/10* (2018.01)

(56) References Cited

U.S. PATENT DOCUMENTS

| | | | | |
|---|---|---|---|---|
| 6,850,833 | B1* | 2/2005 | Wang | F02D 41/0055 |
| | | | | 123/568.12 |
| 7,281,518 | B1* | 10/2007 | Allain | F01N 3/103 |
| | | | | 123/382 |
| 7,299,112 | B2* | 11/2007 | LaPlante | F16K 17/02 |
| | | | | 700/282 |
| 7,637,315 | B2* | 12/2009 | Ichinose | G05D 23/192 |
| | | | | 165/243 |
| 7,933,688 | B2* | 4/2011 | LaPlante | F16K 17/02 |
| | | | | 700/281 |
| 8,763,368 | B1* | 7/2014 | Waggener | F02D 41/0235 |
| | | | | 123/694 |
| 9,746,199 | B1* | 8/2017 | Drees | F24F 11/30 |
| 9,874,880 | B2* | 1/2018 | Thuillard | G05D 7/0635 |
| 10,101,730 | B2* | 10/2018 | Wenzel | G06Q 10/04 |
| 2013/0240172 | A1 | 9/2013 | Reilly et al. | |
| 2014/0083673 | A1* | 3/2014 | Thuillard | F24D 19/1015 |
| | | | | 165/299 |
| 2014/0097367 | A1* | 4/2014 | Burt | F24D 19/1015 |
| | | | | 251/129.04 |
| 2014/0144393 | A1* | 5/2014 | Chandler | F24H 1/43 |
| | | | | 122/14.2 |
| 2015/0153119 | A1* | 6/2015 | Friedl | F28F 27/00 |
| | | | | 165/293 |
| 2015/0233597 | A1 | 8/2015 | Dempster et al. | |
| 2016/0115858 | A1* | 4/2016 | Selinger | F01P 7/165 |
| | | | | 701/102 |
| 2017/0363337 | A1 | 12/2017 | Swofford et al. | |

FOREIGN PATENT DOCUMENTS

| | | |
|---|---|---|
| JP | 2000111181 A | 4/2000 |
| JP | 2006284101 A | 10/2006 |
| WO | 2014021931 A1 | 2/2014 |

OTHER PUBLICATIONS

Frese DELTA T Control System, Technote, Jun. 2017, Frese A/S, Slagelse, DK, 5 pgs.

Frese DELTA T Control System, Mounting Instructions, Jun. 2017, 91764, rev0, Frese, 2 pgs.

Frese DELTA T Control System The simple and efficient way to maximise energy savings, Energy Management, Frese, 6 pgs, accessed on Aug. 22, 2018.

NovoCon® S Data sheet, Engineering Tomorrow, May 2018, VD.HU.X2.02, DHS-SRMT/SI, © Danfoss, 36 pgs.

* cited by examiner

TEMPERATURE CONTROL VALVE

CROSS REFERENCE TO RELATED APPLICATIONS

This application claims priority from and the benefit of U.S. Provisional Application Ser. No. 62/550,250, entitled "TEMPERATURE CONTROL VALVE," filed Aug. 25, 2017, which is hereby incorporated by reference in its entirety for all purposes.

BACKGROUND

The present disclosure relates generally to the field of building management systems and associated devices and more particularly to an electronically-controlled valve that modifies the valve position to control flow through the valve based on temperature sensor input from sensors located at the inlet and outlet of a heat exchanger.

A variety of HVAC components, including fan coils, chilled ceilings, air handling units (AHUs), radiant panels, radiators, heater batteries, and heat recovery units often utilize a pressure independent control valve. A pressure independent control valve is a combination of a differential pressure regulator and a regulating valve for flow adjustment. The valves always guarantee a suitable flow rate, and avoid excessive energy consumption. However, as a largely mechanical system, pressure independent control valves are susceptible to failure and their precision may be affected by the presence of dust or dirt in the valve. In addition, pressure independent control valves are often expensive due to the manufacturing and assembly costs of the differential pressure regulator, as well as the weight and size of the regulating valve. A simple, electronic system that regulates flow through a valve in a non-intrusive fashion would therefore be useful.

SUMMARY

In one embodiment of the present disclosure, a heating, ventilation, and air conditioning (HVAC) system includes a heat exchanger configured to circulate a working fluid therethrough, a valve configured to regulate a flow rate of the working fluid through the heat exchanger, and a valve controller configured to modify a valve position control signal received from an external controller, separate from the valve controller, based on a temperature differential of the working fluid entering and exiting the heat exchanger.

In another embodiment of the present disclosure, a temperature control valve (TCV) controller includes a memory device and a processor, and the memory device includes instructions that, when executed by the processor, cause the processor to receive a first value indicative of an inlet temperature of a working fluid entering a heat exchanger of a terminal unit disposed within a conditioned space, receive a second value indicative of an outlet temperature of the working fluid exiting the heat exchanger, and determine a working fluid valve position control signal based on a temperature differential of the outlet temperature and the inlet temperature and based on a temperature differential setpoint.

In a further embodiment of the present disclosure, a temperature control valve (TCV) system includes a first temperature sensor configured to detect an inlet temperature of a working fluid entering a heat exchanger of a terminal unit, a second temperature sensor configured to detect an outlet temperature of the working fluid exiting the heat exchanger, a valve configured to regulate a flow rate of the working fluid through the heat exchanger, and a controller configured to determine a valve position control signal based on a temperature differential of the outlet temperature and the inlet temperature.

Other features and advantages of the present application will be apparent from the following, more detailed description of the embodiments, taken in conjunction with the accompanying drawings which illustrate, by way of example, the principles of the application.

DETAILED DESCRIPTION

Before turning to the FIGURES, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Building Management System and HVAC System

Figure 1:
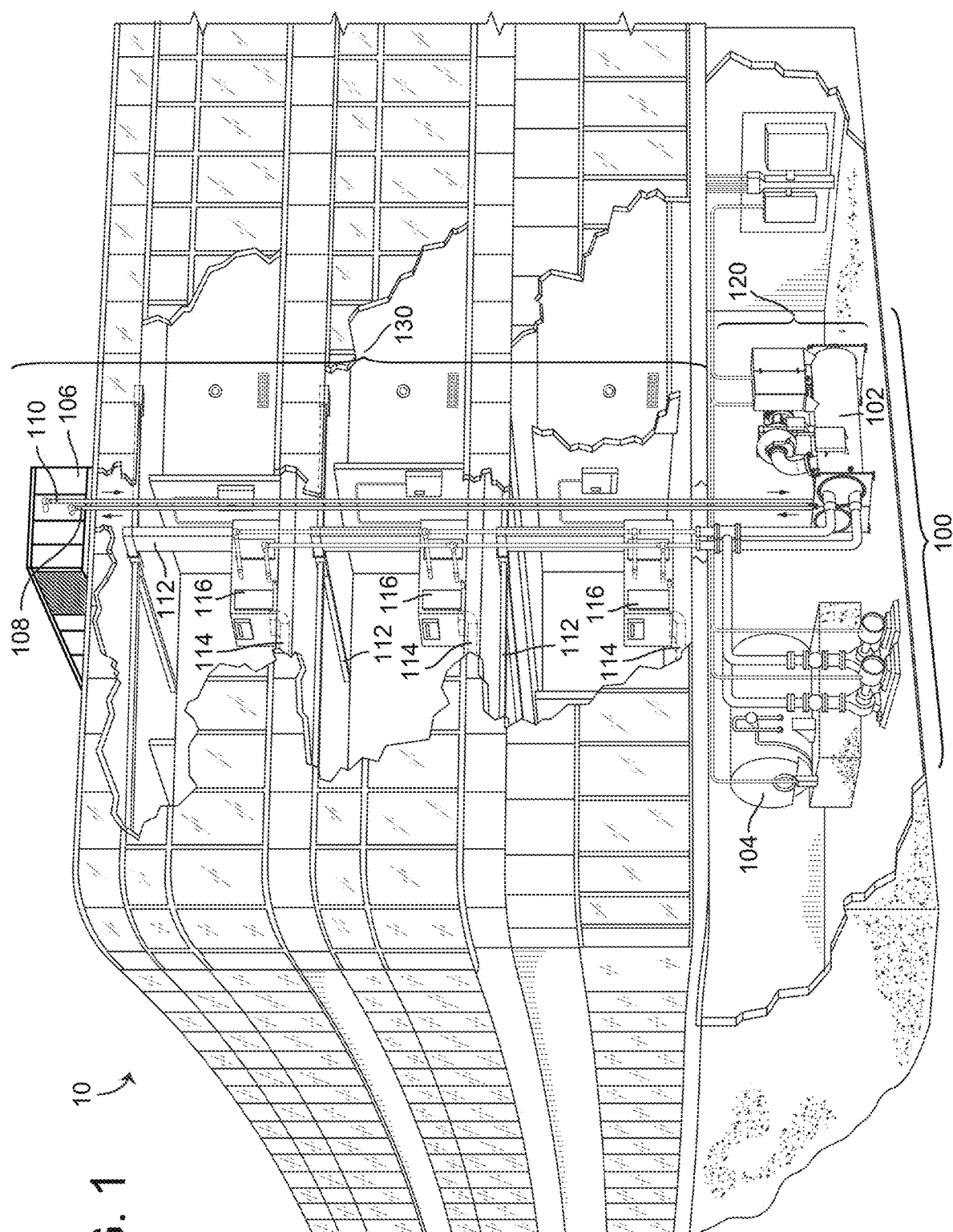
FIG. 1 is a drawing of a building equipped with a heating, ventilating, or air conditioning (HVAC) system and a building management system (BMS), according to some embodiments.

Referring now to FIGS. 1-4, an exemplary building management system (BMS) and HVAC system in which the systems and methods of the present disclosure can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130.

Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
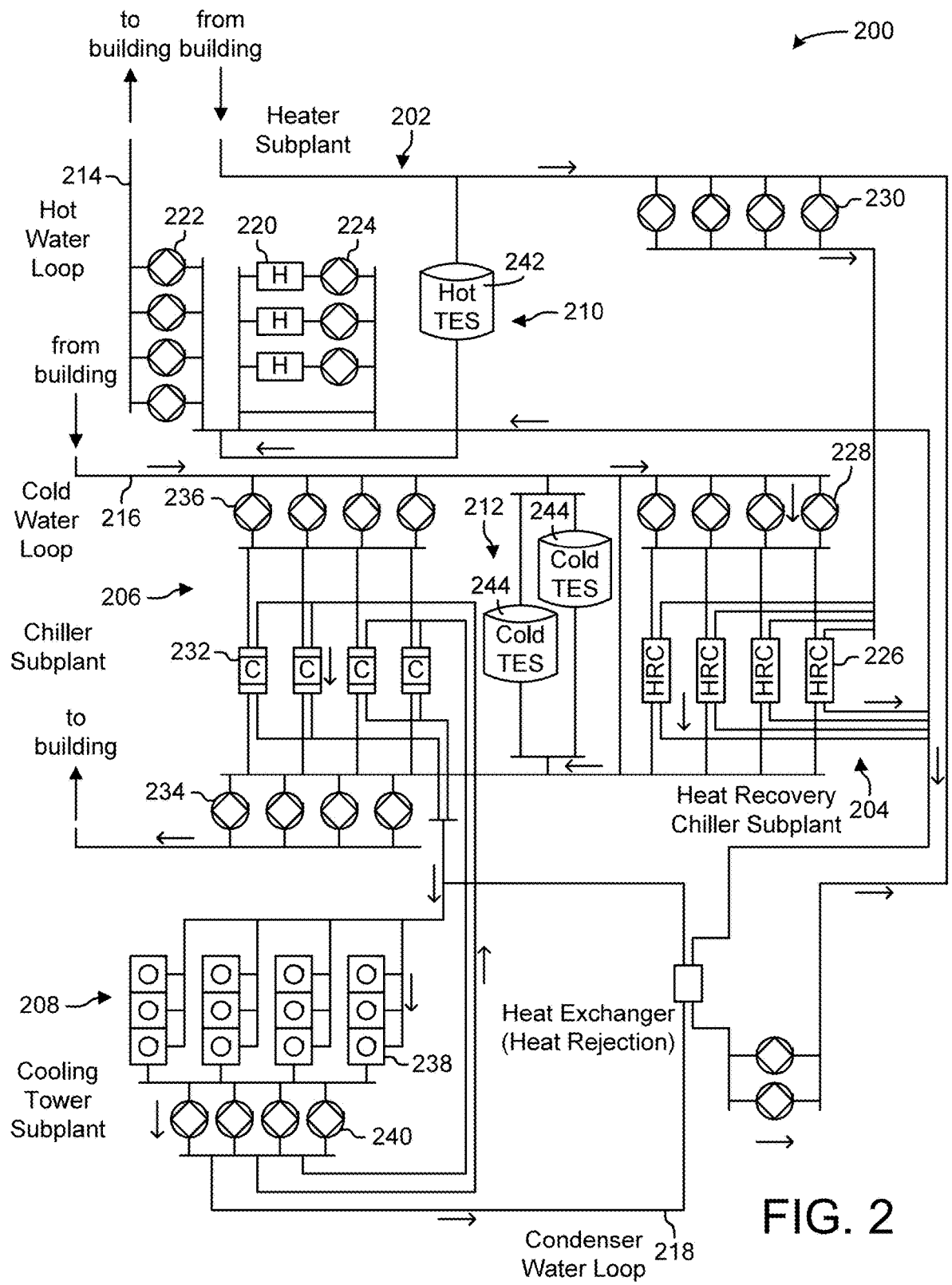
FIG. 2 is a schematic diagram of a waterside system that can be used to support the HVAC system of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
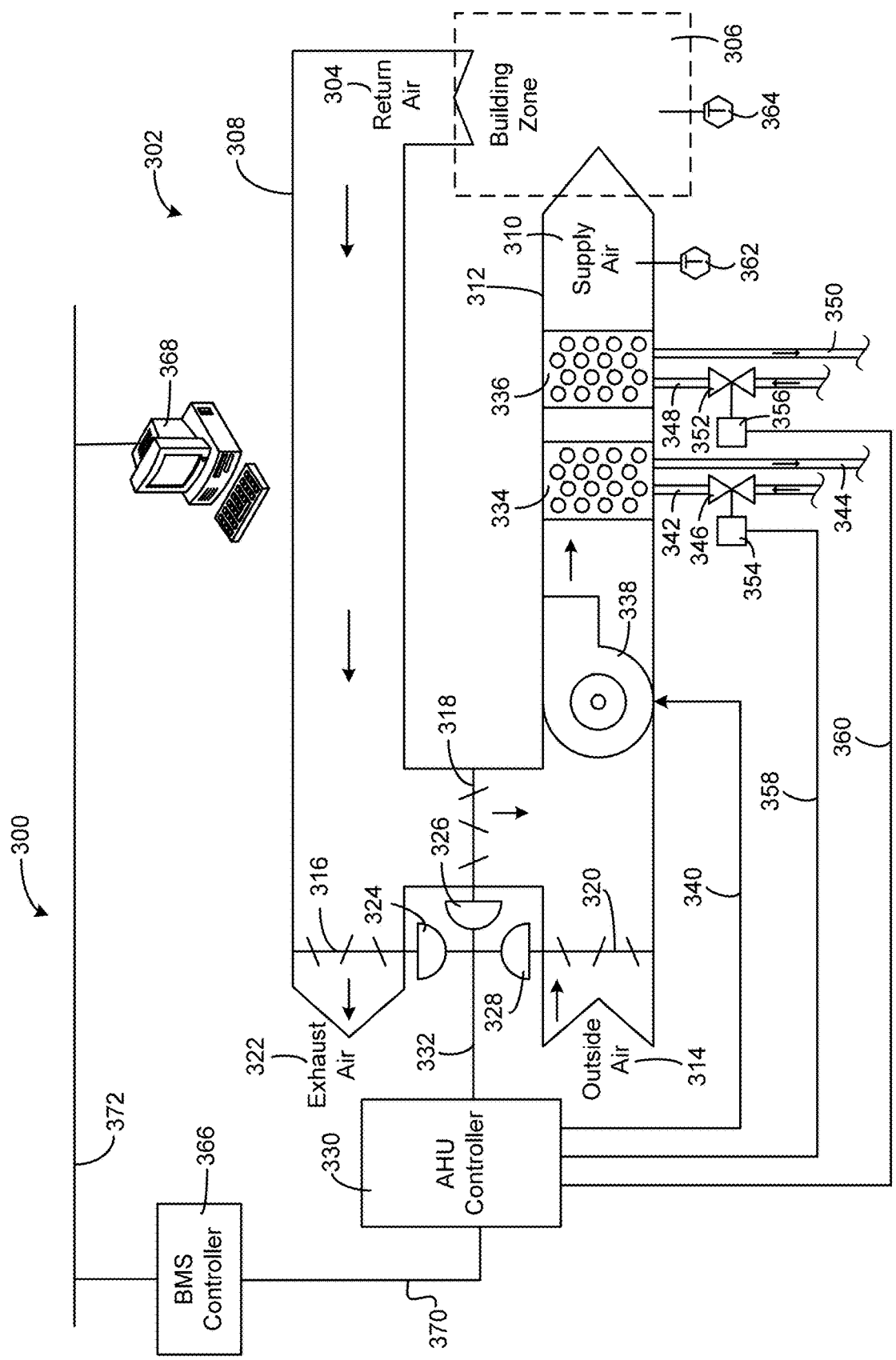
FIG. 3 is a block diagram of an airside system that can be used as part of the HVAC system of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
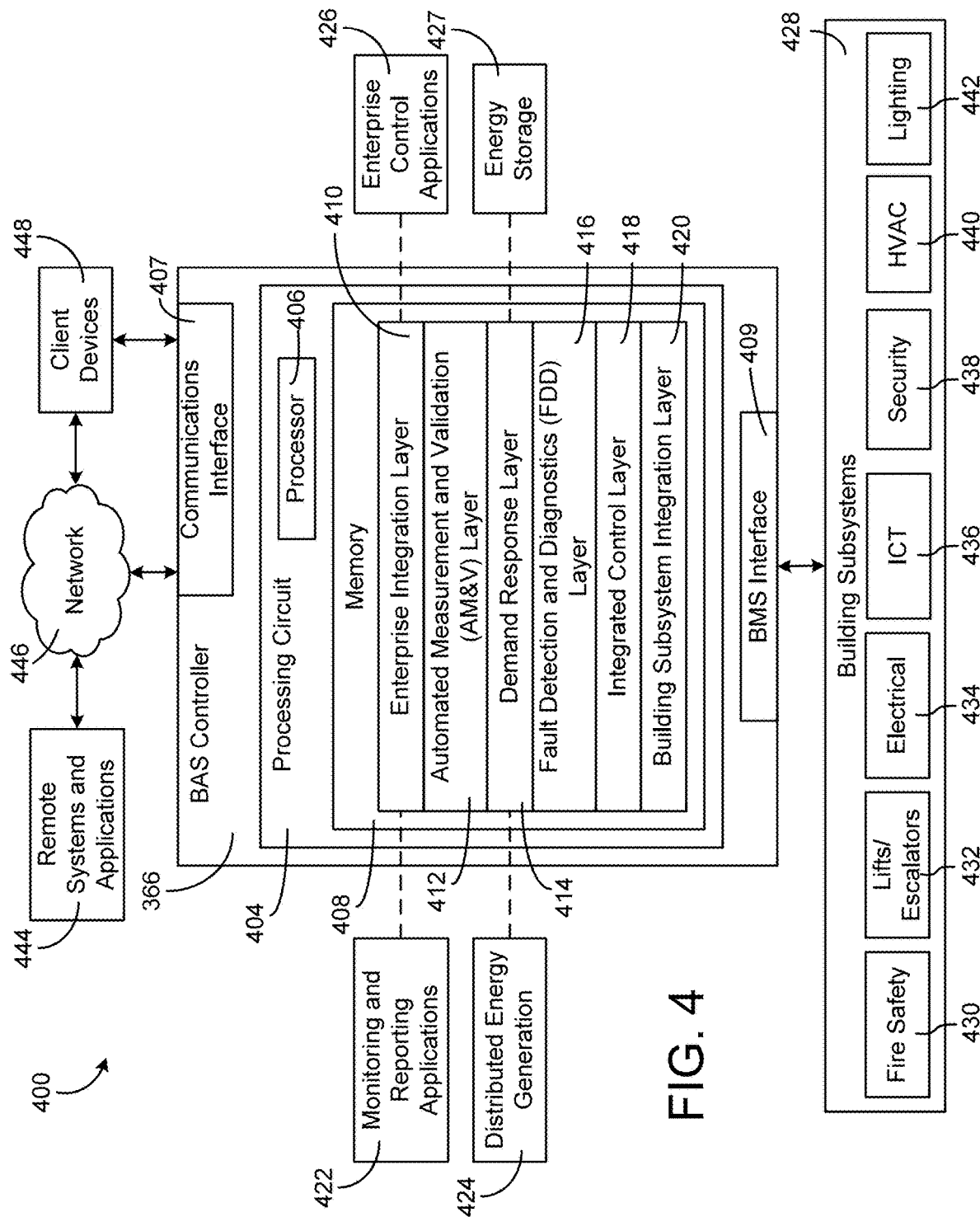
FIG. 4 is a block diagram of a BMS that can be implemented in the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translates communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfying the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Temperature Control Valve System

Figure 5:
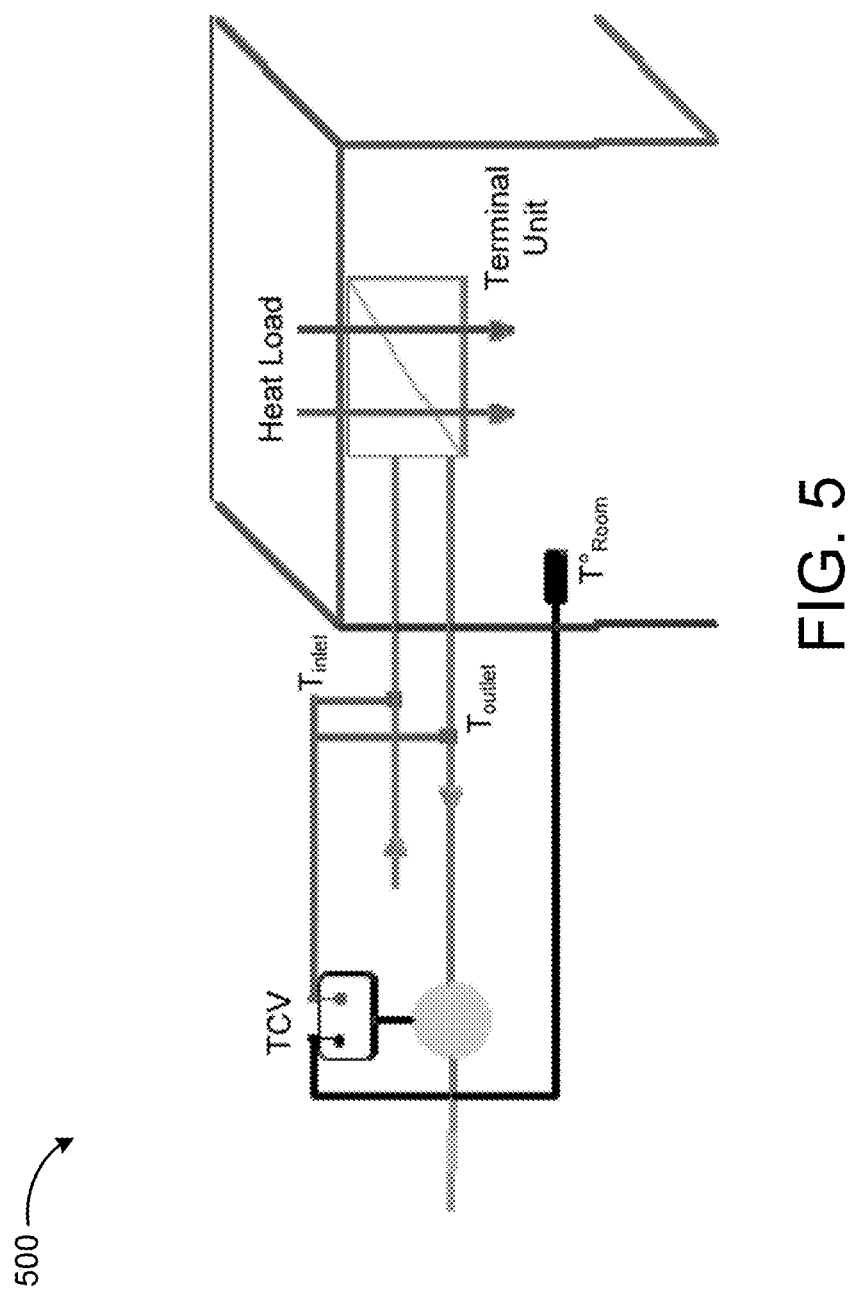
FIG. 5 is a schematic diagram of a terminal unit regulated via a temperature control valve system, according to some embodiments.

Referring now to FIG. 5, a schematic diagram of a terminal unit system 500 regulated via a temperature control valve (TCV) system is depicted. In various embodiments, a terminal unit may refer to a subset of HVAC components (e.g., a heating coil, a cooling coil, and a damper) configured to control the environmental conditions of a single room. For example, properties of the room such as the number of people within the room, the number and type of lights operating in the room, the number of open and closed windows in the room, and the operational status of machinery located in the room may all affect the heat load required from the terminal unit.

The physical equation governing the heat transfer through a heat exchanger (e.g., the terminal unit) is as follows:

$$\dot{Q} = \dot{V} \times \rho \times C_p \times \Delta T$$

where $\dot{Q}$ is the heat power transferred in the heat exchanger, $\dot{V}$ is the flow rate of the fluid, $\rho$ is the density of the fluid, $C_p$ is the specific heat capacity of the fluid, and $\Delta T$ is the temperature differential across the inlet and outlet of the heat exchanger. The equation for $\Delta T$ is therefore as follows:

$$\Delta T = |T_{inlet} - T_{outlet}|$$

Since the density and specific heat capacity are characteristic values of the fluid, in order to obtain a desired value of heat power, the flow rate and temperature difference across the heat exchanger must be controlled. In a pressure independent control valve (PICV), fluctuations in pressure are rejected via a differential pressure regulator in order to control the flow rate. In some embodiments, the differential pressure regulator is a flexible rubber diaphragm that flexes against a spring to vary the size of the valve opening.

By contrast, in the terminal unit system 500 as depicted in FIG. 5, the temperature differential across the heat exchanger (i.e., ΔT) is controlled via a TCV system in order to obtain the desired value of heat power. As shown, the TCV system receives input from temperature sensors located in the fluid inlet and the fluid outlet of the terminal unit. The TCV system also receives input from a temperature sensor disposed in the ambient air of the room in which the terminal unit is installed. In some embodiments, terminal unit system 500 receives a valve position signal from an external controller based on a room temperature setpoint value and the ambient temperature sensor measurement. After receiving each of these inputs, the TCV system compensates the valve position signal received from the controller in order to adjust the flow through the terminal unit and achieve the desired heat power. In various embodiments, the TCV system compensates for the valve position signal using any suitable control technique (e.g., proportional-integral (PI) control, proportional-integral-derivative (PID) control).

The TCV system provides several advantages over a PICV system. One major advantage is that the TCV requires the use of two non-intrusive and inexpensive temperature sensors in order to control the valve, as opposed to an expensive mechanical pressure regulator. If one or both of the temperature sensors malfunction in the TCV system, it does not affect the functioning of the valve as a malfunction in the pressure regulator does in a PICV system. System startup is faster in a TCV system, because the TCV system does not have a fixed maximum flow rate constraint. Finally, the TCV system functions as a failure detection system for the heat exchanger it controls. If one of the inlet or outlet temperature sensors detects an abnormally high or low temperature reading, a user or technician can quickly pinpoint the fault to the heat exchanger, rather than waiting for the heat exchanger malfunction to become detectable in the ambient air temperature measurement of the room.

Figure 6:
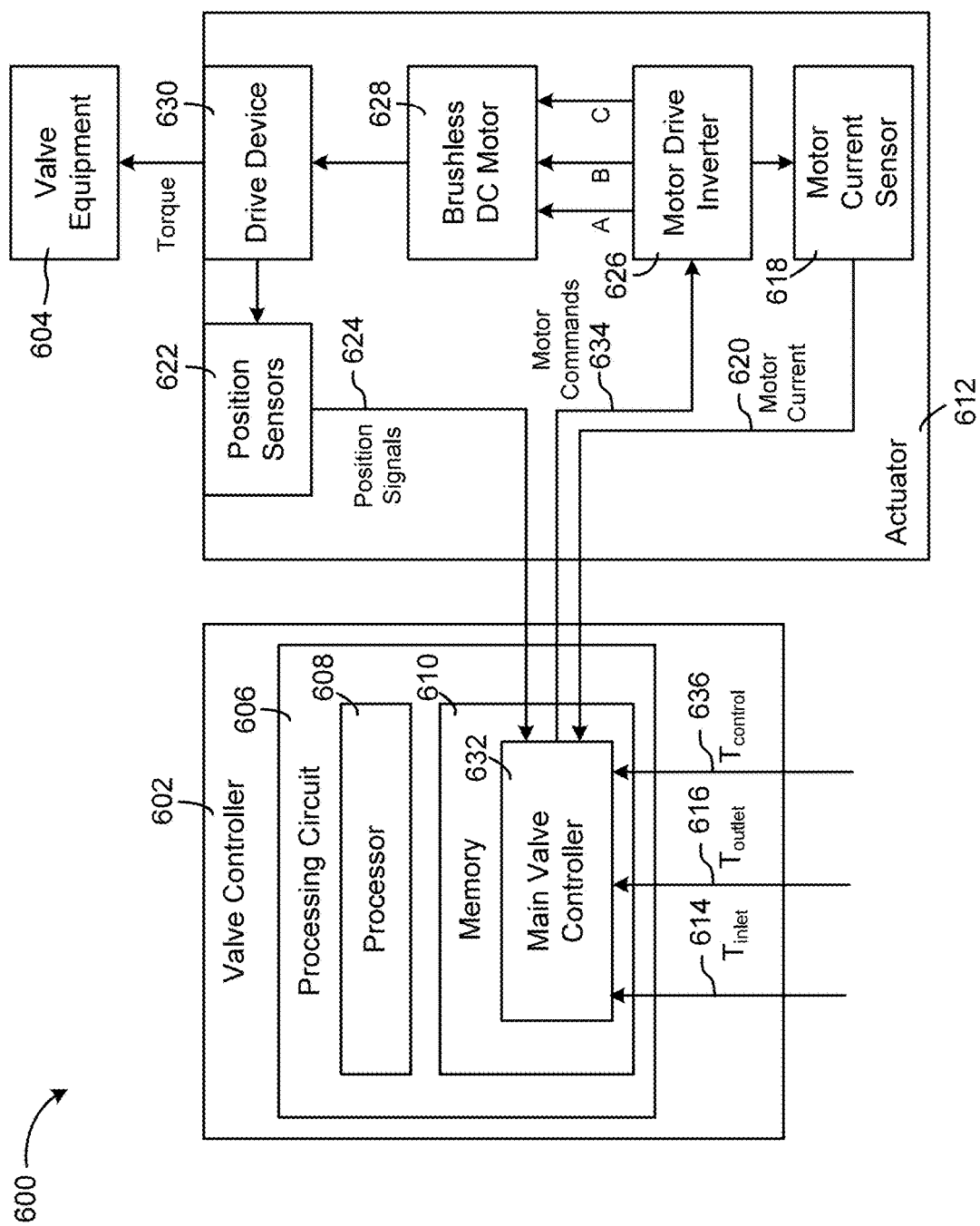
FIG. 6 is a block diagram of the temperature control valve system of FIG. 5, according to some embodiments.

Turning now to FIG. 6, a block diagram of a TCV system 600 is shown, according to some embodiments. TCV system 600 may be used in HVAC system 100, waterside system 200, airside system 300, BMS 400, or terminal unit system 500 as described with reference to FIGS. 1-5 above. TCV system 600 is shown to include a valve controller 602 and an actuator 612. Valve controller 602 may be configured to generate control signals that cause actuator 612 to operate valve equipment 604. In one embodiment, valve controller 602, actuator 612, and valve equipment 604 are packaged within a common device chassis. In other embodiments, valve controller 602, actuator 612, and valve equipment 604 are packaged as multiple devices.

Valve controller 602 is shown to include a processing circuit 606 communicably coupled to a brushless DC (BLDC) motor 628 disposed within actuator 612. Processing circuit 606 is shown to include a processor 608, memory 610, and a main actuator controller 632. Processor 608 can be a general purpose or specific purpose processor, an application specific integrated circuit (ASIC), one or more field programmable gate arrays (FPGAs), a group of processing components, or other suitable processing components. Processor 608 can be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 can be communicably connected to processor 608 via processing circuit 606 and may include computer code for executing (e.g., by processor 608) one or more processes described herein. When processor 608 executes instructions stored in memory 610, processor 608 generally configures actuator 612 (and more particularly processing circuit 606) to complete such activities.

As described above, main valve controller 632 may be configured to receive inlet temperature signal 614 from a temperature sensor disposed at the inlet of a heat exchanger, outlet temperature signal 616 from a temperature sensor disposed at the outlet of the heat exchanger, and controller signal 636 in the form of a valve position signal from an external controller based on an ambient temperature sensor disposed in the room. In some embodiments, the main valve controller 632 may modify the controller signal 636 from the external controller based on the inlet temperature signal 614, the outlet temperature signal 616, and/or a temperature differential between the inlet temperature signal 614 and the outlet temperature signal 616 in order to control a position of the valve equipment 604. In some embodiments, the main valve controller 632 may utilize the controller signal 636 to control the position of the valve equipment 604 without modifying the controller signal 636. Additionally or alternatively, the valve controller 602 and/or the main valve controller 632 may communicate with the external controller to provide feedback, such as feedback indicative of a valve position and/or a valve adjustment of the valve equipment 604, to enable the external controller, which may be an external supervisory system, to coordinate operation of other HVAC system components, such as a chiller and/or a boiler, to improve overall system efficiency and performance. In some embodiments, the valve controller 602 and/or the main valve controller 632 is configured to control the valve equipment 604 independent of the external controller. In some embodiments, the valve controller 602 and/or the main valve controller 632 may control the valve equipment 604 without utilizing the controller signal 636 from the external controller. For example, the valve controller 602 and/or the main valve controller 632 may receive feedback from a thermostat and/or the ambient temperature sensor within the room to be conditioned by the terminal unit. The feedback from the thermostat and/or the ambient temperature sensor may be indicative of a temperature within the room to be conditioned by the terminal unit, a temperature setpoint of the room to be conditioned by the terminal unit, and/or another suitable signal from the thermostat and/or the ambient temperature sensor. Main valve controller 632 may also receive position signals 624 from position sensors 622. Main valve controller 632 may be configured to determine the position of BLDC motor 628 and/or drive device 630 based on position signals 624. In some embodiments, main valve controller 632 receives data from additional sources. For example, motor current sensor 618 may be configured to measure the electric current provided to BLDC motor 628. Motor current sensor 618 may generate a feedback signal indicating the motor current 620 and may provide this signal to main valve controller 632 within processing circuit 608.

Still referring to FIG. 6, processing circuit 608 may be configured to output a pulse width modulated (PWM) DC motor command 634 to control the speed of the BLDC motor. BLDC motor 628 may be configured to receive a three-phase PWM voltage output (e.g., phase A, phase B, phase C) from motor drive inverter 626. The duty cycle of the PWM voltage output may define the rotational speed of BLDC motor 628 and may be determined by processing circuit 606 (e.g., a microcontroller). Processing circuit 606 may increase the duty cycle of the PWM voltage output to increase the speed of BLDC motor 628 and may decrease the duty cycle of the PWM voltage output to decrease the speed of BLDC motor 628.

BLDC motor 628 may be coupled to drive device 630. Drive device 630 may be a drive mechanism, a hub, or other device configured to drive or effectuate movement of a HVAC system component (e.g., valve equipment 604). For example, drive device may be configured to receive a shaft of a damper, a valve, or any other movable HVAC system component in order to drive (e.g., rotate) the shaft. In some embodiments, actuator 612 includes a coupling device configured to aid in coupling drive device 630 to the movable HVAC system component. For example, the coupling device may facilitate attaching drive device 630 to a valve or damper shaft.

Position sensors 622 may include Hall effect sensors, potentiometers, optical sensors, or other types of sensors configured to measure the rotational position of BLDC motor 628 and/or drive device 630. Position sensors 622 may provide position signals 624 to processing circuit 606. Main valve controller 632 may use position signals 624 to determine whether to operate BLDC motor 628. For example, main valve controller 632 may compare the current position of drive device 630 with a position setpoint and may operate BLDC motor 628 to achieve the position setpoint.

Main valve controller 632 may also be configured to support data communications from actuator 612. For example, main valve controller 632 may receive motor current 620, a measured or calculated motor torque, the actuator position or speed, configuration parameters, end stop locations, stroke length parameters, commissioning data, equipment model data, firmware versions, software versions, time series data, a cumulative number of stop/start commands, a total distance traveled, an amount of time required to open/close equipment 604 (e.g., a valve), or any other type of data used or stored internally within actuator 612.

In some embodiments, controller signal 636 is a DC voltage control signal. Actuator 612 can be a linear proportional actuator configured to control the position of drive device 630 according to the value of the DC voltage received. For example, a minimum input voltage (e.g., 0.0 VDC) may correspond to a minimum rotational position of drive device 630 (e.g., 0 degrees, −5 degrees, etc.), whereas a maximum input voltage (e.g., 10.0 VDC) may correspond to a maximum rotational position of drive device 630 (e.g., 90 degrees, 95 degrees, etc.). Input voltages between the minimum and maximum input voltages may cause actuator 612 to move drive device 630 into an intermediate position between the minimum rotational position and the maximum rotational position. In other embodiments, actuator 612 can be a non-linear actuator or may use different input voltage ranges or a different type of input control signal (e.g., AC voltage or current) to control the position and/or rotational speed of drive device 630.

In some embodiments, controller signal 636 is an AC voltage control signal having a standard power line voltage (e.g., 120 VAC or 230 VAC at 50/60 Hz). The frequency of the voltage signal can be modulated (e.g., by main actuator controller 632) to adjust the rotational position and/or speed of drive device 630. In some embodiments, actuator 612 uses the voltage signal to power various components of actuator 612. Actuator 612 may use the AC voltage signal received as a control signal, a source of electric power, or both. In some embodiments, the voltage signal is received from a power supply line that provides actuator 612 with an AC voltage having a constant or substantially constant frequency (e.g., 120 VAC or 230 VAC at 50 Hz or 60 Hz).

Figure 7:
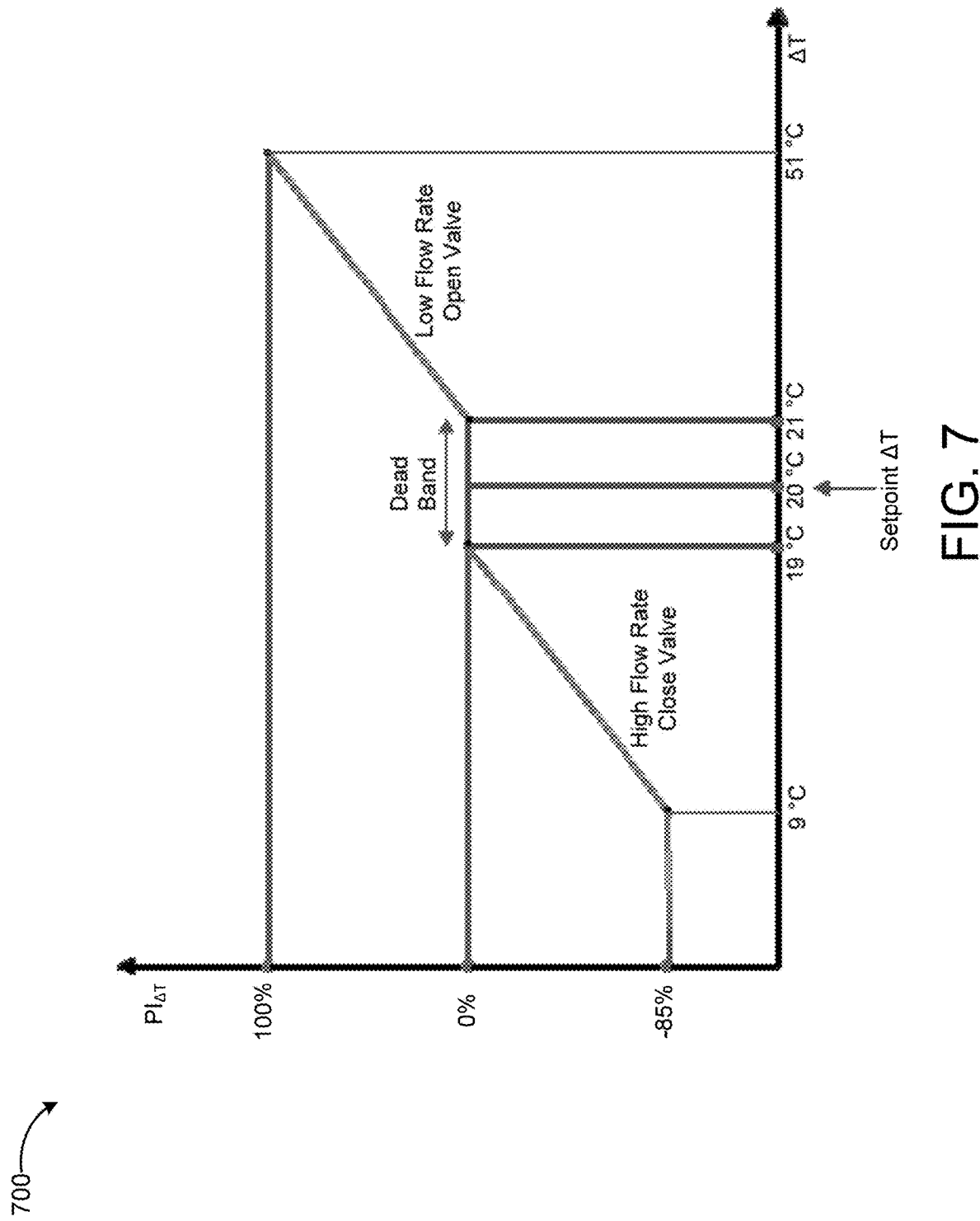
FIG. 7 is graph illustrating a valve position setpoint signal versus a temperature differential compensation signal, according to some embodiments.

Referring now to FIG. 7, a graph 700 plotting the valve position setpoint compensation signal versus the temperature differential signal is depicted. In various embodiments, the valve position setpoint compensation signal is representative of the amount the valve position control signal received from the external controller (e.g., controller signal 636) must be modified in order to achieve a differential temperature setpoint. As shown, the x-axis depicts the temperature differential (i.e., $\Delta T$) between the measured inlet and outlet temperature signals received by the temperature control valve (e.g., inlet temperature signal 614 and outlet temperature signal 616). In one embodiment, the temperature differential is expressed in degrees Celsius, although the differential may be expressed in any suitable unit (e.g., degrees Fahrenheit, degrees Kelvin). The y-axis is representative of the TCV compensation signal (i.e., $PI_{\Delta T}$) as a percentage.

Whether the TCV system is operating in a heating mode (e.g., when implemented with a boiler unit, as depicted in FIG. 7) or a cooling mode (e.g., when implemented with a with a chiller unit), the response of the TCV system to the detected temperature differential is the same. If the measured temperature differential between the inlet and outlet temperatures is larger than the differential setpoint value, (e.g., per FIG. 7, when $\Delta T$ ranges from 21° C. to 51° C.), the environmental condition of the room requires greater load from the heat exchanger than the current supply. In this case, the TCV controller transmits a compensation signal to the actuator operating the valve mechanism to open the valve in order to increase the flow rate through the valve. In some embodiments, the compensation signal to open the valve may range between 0% and 100%, where 0% represents the valve holding in its current position and 100% represents the valve in a fully open position.

Conversely, if the measured temperature differential between the inlet and outlet temperatures is smaller than the differential setpoint valve (e.g., per FIG. 7, when $\Delta T$ ranges from 9° C. to 19° C.), the environmental condition of the room requires less load than the current supply, so the TCV controller transmits a signal to the actuator to close the valve in order to decrease the flow rate through the valve. For example, the compensation signal to close the valve may range between 0% and −85%. Again, 0% represents the valve holding in its current position, while −85% represents the valve in a 15% open position. In various embodiments, the TCV controller may prevent the actuator from closing the valve to a position less than 15% open in order to avoid disrupting the start-up of the system.

If the measured temperature differential is close to the differential setpoint value (e.g., per FIG. 7, the "dead band" where $\Delta T$ ranges from 19° C. to 21° C.), the TCV compensation signal transmits a signal to the actuator to hold the valve in its current position. In various embodiments, the size of the dead band may be dependent on the value of the differential setpoint. For example, the differential setpoint value for a boiler assembly may be 20° C., as depicted in FIG. 7, and the dead band may have an overall width of 2° C. As another example, the differential setpoint value for a chiller assembly may be only 5° C., and the dead band may have a smaller overall width (e.g., 1° C. or less).

Figure 8:
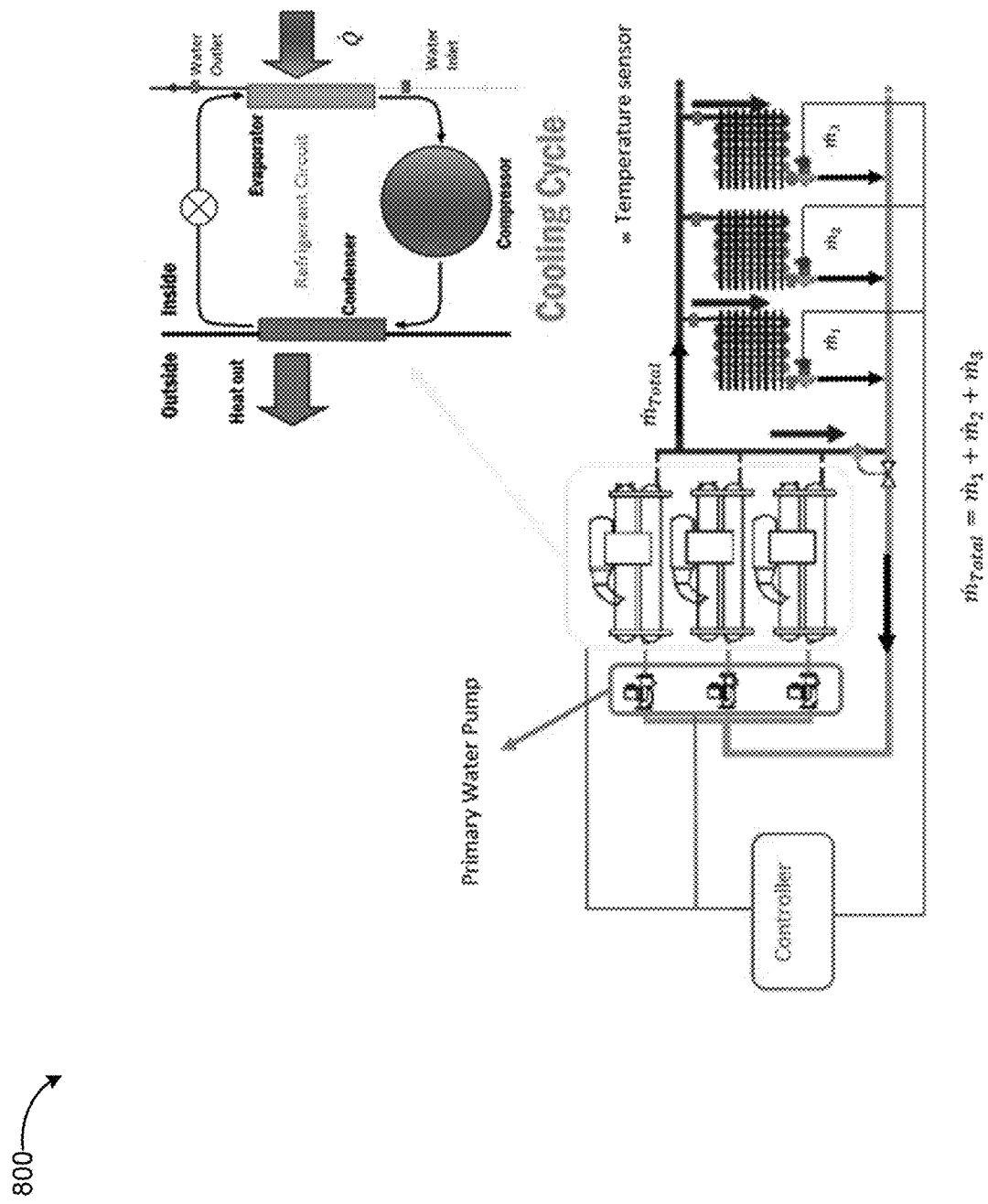
FIG. 8 is a schematic diagram of an optimized variable flow system, according to some embodiments.

Turning now to FIG. 8, an optimized variable flow system 800 is depicted, according to some embodiments. As shown, variable flow system 800 includes a controller, multiple primary water pumps, multiple chiller assemblies employing refrigerant circuits. The primary heat pumps and the chiller assemblies may collectively be referred to as a "central unit." Variable flow system 800 is further shown to include multiple heat exchangers (e.g., terminal units). Each heat exchanger is shown to include a temperature sensor at the inlet and a temperature sensor at the outlet that provide measured temperature input to a TCV system disposed at the outlet of the heat exchanger.

The actuators of each TCV system may be linked to the controller to transmit information regarding the condition of each terminal unit and perturbations in the system. Once a perturbation is detected, the controller may regulate the pressure (i.e., flow rate) in the primary water pumps and the temperature of the water in the refrigeration circuits instead of optimizing every heat exchanger in order to save as much energy as possible and improve the Total Cost of Operation (TCO) of the building. By controlling the inlet and/or outlet temperatures in the heat exchangers via the TCV systems, it is also possible to provide early diagnosis of failures in the pipe water circuit in zones between the refrigerant circuit outlet and the inlets of the heat exchangers, within the heat exchangers, and between the outlets of the heat exchangers and the inlet of the refrigerant circuit. In some embodiments, this differentiation between zones permits users and technicians the ability to pinpoint the locations of faults in order to resolve them more quickly.

Implementation of heat exchangers with associated TCV systems may also permit detection of leakages within the variable flow system 800. By controlling the temperature differential across each heat exchanger and across the refrigerant circuit, along with the application of a dynamic method to resolve continuity and hydraulic equations, it is possible to calculate the flow rate of the plant and of each single heat exchanger. As shown in FIG. 8, the flow rate of each heat exchanger is expressed as $\dot{m}_n$, while the flow rate of the plant is expressed as the following:

$$\dot{m}_{total} = \dot{m}_1 + \dot{m}_2 + \cdots + \dot{m}_n$$

By calculating the heat power transferred in the refrigerant circuit, it is possible to know the heat power transferred in every heat exchanger and detect leakages in the system.

A temperature control valve system in an HVAC system is configured to modify an environmental condition of a building. The system includes a valve controller communicably coupled to an actuator. The actuator includes a motor and a drive device. The drive device is driven by the motor and is coupled to a valve mechanism for driving the valve between multiple positions. The valve controller includes a processing circuit coupled to the motor. The processing circuit is configured to receive a first temperature measurement from a temperature sensor located at the inlet of a heat exchanger and a second temperature measurement from a temperature sensor located at the outlet of the heat exchanger. Based at least in part on the differential between the first temperature measurement and the second temperature measurement, the valve controller modifies a valve position signal received from an external controller.

Configuration of Exemplary Embodiments

The construction and arrangement of the systems and methods as shown in the various exemplary embodiments are illustrative only. Although only a few embodiments have been described in detail in this disclosure, many modifications are possible. For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. A heating, ventilation, and air conditioning (HVAC) system, comprising:
   a heat exchanger configured to circulate a working fluid therethrough;
   a valve configured to regulate a flow rate of the working fluid through the heat exchanger; and
   a valve controller configured to receive a valve position control signal from an external controller, separate from the valve controller, wherein the valve controller is configured to modify the valve position control signal based on a comparison of a temperature differential of the working fluid entering the heat exchanger and the same working fluid exiting the heat exchanger and a temperature differential setpoint.

2. The HVAC system of claim 1, wherein the heat exchanger is disposed within an airflow path, and the heat exchanger is configured to condition an airflow supplied to a conditioned space via heat transfer between the working fluid and the airflow.

3. The HVAC system of claim 1, comprising a chiller configured to direct a chilled water flow as the working fluid to the heat exchanger, a boiler configured to direct a heated water flow as the working fluid to the heat exchanger; or both.

4. The HVAC system of claim 1, comprising:
a first temperature sensor configured to detect an inlet temperature of the working fluid entering the heat exchanger; and
a second temperature sensor configured to detect an outlet temperature of the same working fluid exiting the heat exchanger.

5. The HVAC system of claim 4, wherein the valve controller is configured to:
receive a first value indicative of the inlet temperature from the first temperature sensor;
receive a second value indicative of the outlet temperature from the second temperature sensor;
calculate the temperature differential based on the first value and the second value; and
output a modified valve position control signal based on the valve position control signal and the comparison of the temperature differential and the temperature differential setpoint to adjust a position of the valve and adjust the flow rate of the working fluid through the heat exchanger.

6. The HVAC system of claim 1, wherein the valve controller is configured to modify the valve position control signal to adjust the valve toward an open position when the temperature differential exceeds the temperature differential setpoint.

7. The HVAC system of claim 1, wherein the valve controller is configured to modify the valve position control signal to adjust the valve toward a closed position when the temperature differential is less than the temperature differential setpoint.

8. The HVAC system of claim 7, wherein the valve controller is configured to prevent the valve from reaching a fully closed position.

9. The HVAC system of claim 1, comprising a chiller having a common heat exchanger, wherein the common heat exchanger is configured to place the working fluid in a heat exchange relationship with a refrigerant of the chiller, and wherein the valve controller is configured to detect a fault of the HVAC system based on the temperature differential, a temperature of the working fluid flowing from the common heat exchanger to the heat exchanger, a temperature of the working fluid flowing from the heat exchanger to the common heat exchanger, or any combination thereof.

10. The HVAC system of claim 9, comprising an additional heat exchanger configured to receive the working fluid from the chiller and circulate the working fluid through the additional heat exchanger, wherein the valve controller is configured to detect a leak in the HVAC system based on the temperature differential, the temperature of the working fluid flowing from the common heat exchanger to the heat exchanger, the temperature of the working fluid flowing from the heat exchanger to the common heat exchanger, an additional temperature differential of the working fluid entering the additional heat exchanger and the same working fluid exiting the additional heat exchanger, a temperature of the working fluid flowing from the common heat exchanger to the additional heat exchanger, a temperature of the working fluid flowing from the additional heat exchanger to the common heat exchanger, or a combination thereof.

11. The HVAC system of claim 1, wherein the valve position control signal is based on a difference between an ambient temperature and an ambient temperature setpoint.

12. The HVAC system of claim 1, wherein the temperature differential setpoint is a constant value or a constant range of values.

13. The HVAC system of claim 1, wherein the valve controller is configured to modify the valve position control signal to maintain a position of the valve when the temperature differential is within a target temperature differential range, and wherein the temperature differential setpoint is within the target temperature differential range.

14. A temperature control valve (TCV) controller, comprising a memory device and a processor, and wherein the memory device includes instructions that, when executed by the processor, cause the processor to:
receive a first value indicative of an inlet temperature of a working fluid entering a heat exchanger of a terminal unit disposed within a conditioned space;
receive a second value indicative of an outlet temperature of the same working fluid exiting the heat exchanger;
receive an initial working fluid valve position control signal from an external controller, separate from the TCV controller; and
modify the initial working fluid valve position control signal to generate an adjusted working fluid valve position control signal, wherein the adjusted working fluid valve position control signal is based on a comparison of a temperature differential of the outlet temperature and the inlet temperature and a temperature differential setpoint.

15. The TCV controller of claim 14, wherein the initial working fluid valve position control signal is based on an ambient temperature of the conditioned space.

16. The TCV controller of claim 15, wherein the initial working fluid valve position control signal is based on a difference between the ambient temperature and an ambient temperature setpoint.

17. The TCV controller of claim 14, wherein the temperature differential setpoint is a constant value or a constant range of values.

18. The TCV controller of claim 14, wherein the memory device includes instructions that, when executed by the processor, cause the processor to output the adjusted working fluid valve position control signal to adjust a working fluid valve toward a closed position when the temperature differential is less than the temperature differential setpoint.

19. The TCV controller of claim 14, wherein the memory device includes instructions that, when executed by the processor, cause the processor to output the adjusted working fluid valve position control signal to maintain a position of a working fluid valve when the temperature differential is within a target temperature differential range, wherein the temperature differential setpoint is within the target temperature differential range.

20. A temperature control valve (TCV) system, comprising:
a first temperature sensor configured to detect an inlet temperature of a working fluid entering a heat exchanger of a terminal unit;

a second temperature sensor configured to detect an outlet temperature of the same working fluid exiting the heat exchanger;

a valve configured to regulate a flow rate of the working fluid through the heat exchanger; and a controller configured to receive an initial valve position control signal from an external controller, separate from the controller, wherein the controller is configured to modify the initial valve position control signal to generate an adjusted valve position control signal based on a comparison of a temperature differential of the outlet temperature and the inlet temperature and a temperature differential setpoint.

21. The TCV system of claim 20, wherein the initial valve position control signal is based on an ambient temperature of a conditioned space having the terminal unit.

22. The TCV system of claim 20, wherein the controller is further configured to generate the adjusted valve position control signal based on a deviation of the outlet temperature from an outlet temperature setpoint.

23. The TCV system of claim 22, wherein the controller is configured to modify the initial valve position control signal to adjust the valve toward a closed position when the outlet temperature is less than the outlet temperature setpoint, and wherein the controller is configured to modify the initial valve position control signal to adjust the valve toward an open position when the outlet temperature is greater than the outlet temperature setpoint.

24. The TCV system of claim 21, wherein the initial valve position control signal is based on a difference between the ambient temperature and an ambient temperature setpoint.

25. The TCV system of claim 20, wherein the temperature differential setpoint is a constant value or a constant range of values.

26. The TCV system of claim 20, wherein the controller is configured to maintain a position of the valve when the temperature differential is within a target temperature differential range, and wherein the temperature differential setpoint is within the target temperature differential range. setpoint.

* * * * *